United States Patent Office 3,340,207
Patented Sept. 5, 1967

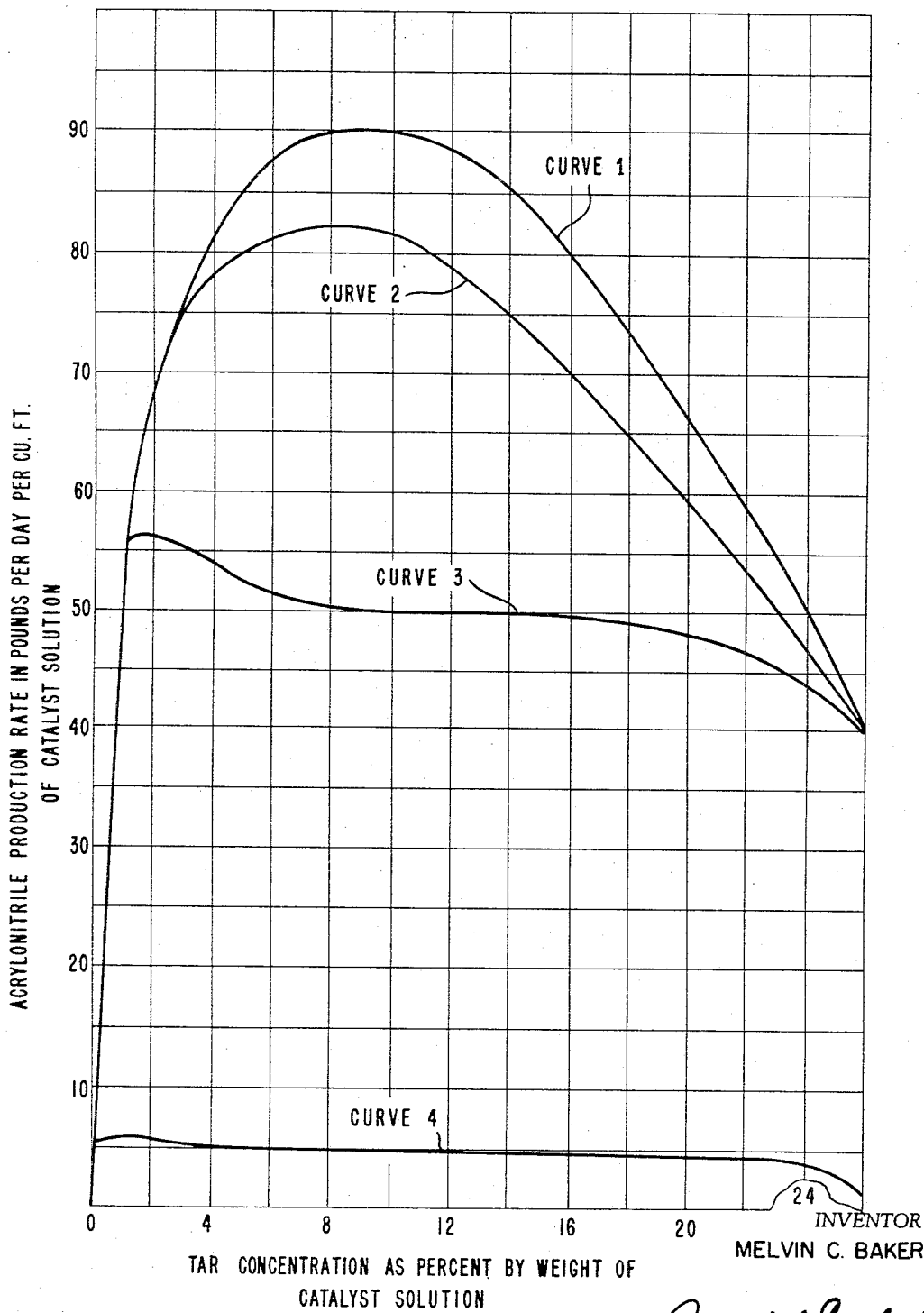

3,340,207
CATALYST COMPOSITION
Melvin C. Baker, Lewiston, N.Y., assignor to E. I. du Pont de Nemours and Company, Wilmington, Del., a corporation of Delaware
Original application Jan. 10, 1962, Ser. No. 165,400. Divided and this application Nov. 19, 1964, Ser. No. 412,460
4 Claims. (Cl. 252—429)

ABSTRACT OF THE DISCLOSURE

A non-aqueous catalyst composition containing cuprous chloride, an organic nitrile, a carboxamide catalyst promoter and a silver salt activator is useful as a catalyst for producing acrylonitrile from acetylene and hydrogen cyanide.

This application is a divisional application of my copending application Ser. No. 165,400, filed Jan. 10, 1962, and now abandoned.

This invention relates to the production of acrylonitrile by the reaction of hydrogen cyanide and acetylene in a non-aqueous liquid catalyst, and is more particularly concerned with improvement of anhydrous cuprous chloride catalyst solutions for producing acrylonitrile.

The liquid phase production of acrylonitrile is known to require a large investment in equipment. For economical production it is important to obtain high productivity from this equipment. Productivity will be evaluated herein as pounds of acrylonitrile produced per day per cubic foot of catalyst solution, and will be referred to as space-time-yield (STY). It is also important to minimize by-product formation, both to obtain high yields of acrylonitrile and to reduce the amount of unwanted material which must be separated, and disposed of, in the process. Aqueous solutions of cuprous chloride catalyst have commonly been used in the liquid phase process for producing acrylonitrile from acetylene and hydrogen cyanide. Non-aqueous catalyst solutions have recently received attention as a way of reducing the formation of unwanted by-products. These do avoid the formation of certain volatile by-products, such as acetaldehyde and lactonitrile, but difficulties with other by-products have remained. Non-volatile by-products have been particularly troublesome, as these accumulate in the reactor and seriously reduce the space-time-yield, unless regularly removed. This complex black mixture of non-volatile by-products solidifies upon cooling and is commonly designated "tars."

Cuprous chloride as such is substantially insoluble in water, so the aqueous catalyst solutions are prepared by forming a soluble cuprous chloride complex with an inorganic salt or organic amine. This is also true of most non-aqueous cuprous chloride catalyst solutions. However, Burris, Sheard and Vines found that cuprous chloride can be dissolved directly in organic nitriles without added solubilizer to form more effective catalyst solutions, as disclosed in their U.S. Patent No. 2,920,098, issued Jan. 5, 1960. The class of organic nitrile is believed to be unique in this respect and to provide a distinct catalyst system containing a new form of active catalyst. Solubilizer salts of the prior art were found to be detrimental. Organic amines greatly increased the proportion of tars formed, and inorganic salts which are substantially insoluble in the new catalyst system form separate phases that clog the reactor.

Although amines are objectionable in the new cuprous chloride-organic nitrile catalyst system, the chemically related class of carboxamide compounds are surprisingly effective promoters for this catalyst system, as disclosed in Rowbottom U.S. Patent No. 2,999,072 and Harris U.S. Patent No. 2,999,073, both issued September 5, 1961. These carboxamides are not solubilizers for cuprous chloride. In fact, they lower the concentration of catalyst which can be present in solution, but this does not become serious until the solution contains more than 30 percent of carboxamide and only about 0.2 to 10 percent is needed as a promoter. As disclosed in the above patents, the carboxamides greatly increase the space-time-yield of acrylonitrile and lower the proportion of tar produced. The dialkylformamides are especially effective in both respects when used as the promoter in amounts of about 1 to 10 percent by weight of the catalyst solution.

It is an object of this invention to provide a further improvement in the above promoted non-aqueous cuprous chloride catalyst compositions and process for producing acrylonitrile. Another object is to increase the productivity of acrylonitrile obtained with the promoted anhydrous cuprous chloride catalyst solution and also obtain a still more favorable ratio of acrylonitrile to tars produced. Other objects will become apparent from the specification and claims.

In accordance with the present invention, acrylonitrile is produced at high productivity and yield by reacting acetylene with hydrogen cyanide at 80–150° C. in a non-aqueous liquid reaction medium comprising at least 5% of cuprous chloride dissolved in an organic nitrile as the essential component for dissolving the cuprous chloride, and promoted with 0.2% to 30% of carboxamide compound and 0.001% to 0.6% of a silver salt based on the weight of liquid reaction medium. The organic nitrile and the carboxamide should have boiling points of at least 100° C. at atmospheric pressure, and be thermally stable at 100° C., to avoid excessive losses from the catalyst solution at the temperature used to produce and vaporize the acrylonitrile, which is most readily recovered as condensate from reaction off-gases. The catalyst solution is preferably maintained acid in continuous operation by introducing hydrogen chloride in an amount between about 1% and 20% by weight of the hydrogen cyanide used. The concentration of by-product tars must be controlled by catalyst replacement, either continuously or intermittently at suitable intervals. The concentration of tars may range from about 2% to about 20%, and should preferably be within the range of 5% to 15% by weight of the liquid reaction medium. Since the presence of water contributes to by-product formation, the liquid reaction medium is preferably kept substantially anhydrous by the use of technically dry feeds of acetylene, hydrogen cyanide and hydrogen chloride, as well as materials used in making up the reaction medium.

The proportions of acetylene and hydrogen cyanide may be varied over a wide range. Molar gas ratios of $C_2H_2$ to HCN in the range of 25:1 to 2:1 are suitable. High ratios are ordinarily undesirable because of the expense of recovering the large amount of unreacted acetylene and recycling it to the process. Low ratios give lower space-time-yields. The most efficient operation is usually at molar ratios in the range of 15:1 to 6:1.

Increasing the rate at which reactants are fed to the reaction medium will increase the space-time-yield until the maximum STY is reached when further increases merely provide increasing amounts of unreacted feed in the off-gas. Preferably a total flow rate is used which will provide a slight excess of hydrogen cyanide and, of course, a considerable excess of acetylene in the reaction off-gas.

Temperatures of about 90°–120° C. and substantially atmospheric pressure are usually best for the reaction. In general, higher temperatures or higher pressures give higher space-time-yields of acrylonitrile but are less favorable with respect to the ratio of acrylonitrile to by-products; lower temperatures give lower space-time-yields and increase the difficulty of maintaining a fluid, homogeneous liquid medium containing a high concentration of cuprous chloride catalyst. The temperature should be high enough to vaporize the acrylonitrile product, which boils at 78° C. under atmospheric pressure. Lower pressures can be used, but the additional expense of vacuum operation usually makes this undesirable.

Increasing the concentration of cuprous chloride catalyst in solution usually results in correspondingly higher space-time-yields without adverse effect on the acrylonitrile to by-product ratio. Preferably the catalyst solution is substantially saturated with cuprous chloride. However, as discussed in U.S. Patent No. 2,999,072, as little as 5% by weight cuprous chloride may be desirable for special purposes.

In the drawing, which is a graphical illustration of typical acrylonitrile production rates (STY) as a function of the amount of tar present in the catalyst solution, for operation under the above conditions, Curve 1 shows a results when operating in accordance with this invention with a catalyst solution of cuprous chloride in organic nitrile containing silver salt and carboxamide compound, Curve 2 shows results when operating in accordance with this invention under comparable conditions, but with a smaller amount of silver salt in solution, Curve 3 shows, for comparison, the effect of omitting the silver salt under otherwise comparable conditions, and Curve 4 shows, for comparison, the effect of omitting the carboxamide compound under conditions otherwise comparable to those for Curve 1.

As illustrated by Curves 1 and 2, the presence of silver salt in addition to the amide promoter makes possible an unexpectedly great increase in productivity in comparison with the productivity of catalyst solutions differing only in containing no silver salt (Curve 3). The productivity of the former is more sensitive to the concentration of tar present than the latter; fortunately, the best results are obtained within the range of 5% to 15% by weight tar in solution, a range which approximates that found desirable for other reasons in continuous operation. The above improvement is even more surprising when compared with results obtained when no amide promoter is present (Curve 4), since the silver salt then has no appreciable effect. The silver salt is not a promoter, but has some other effect in the catalyst system, and will be referred to as an activator.

Trace amounts of silver salt will provide some improvement and 0.001% by weight of the catalyst solution is sufficient for activation. Since silver is relatively expensive and difficult to recover from used catalyst, and amounts greater than 0.6% by weight are unnecessary, this is a practical upper limit. Highly effective activation is obtained in the range of 0.01% to 0.1% by weight of silver salt in the catalyst solution. Due to the hydrogen cyanide and hydrogen chloride fed into the solution, the silver salt is apparently present as a cyanide or chloride salt even though another silver salt is supplied, so a wide variety of silver salts can be added. Accordingly, reference hereinafter to the silver salt as either silver chloride or silver cyanide is not limitative as to the form of salt before it is dissolved in the catalyst solution.

Reference has been made to the drawing to show the improvement in acrylonitrile production rate provided by the presence of silver salt activator. There is a corresponding improvement in the ratio of acrylonitrile product to tar formed. Under the conditions of Curves 1, 2 and 3, the tar concentration increased linearly as a function of time at substantially the same rate in each case. With 5% of dimethylformamide promoter present, the concentration of tar reaches 20% in about 160 hours in the absence of catalyst replacement, independently of the presence or absence of silver salt activator. However, the tar rate in pounds per day per cubic foot of catalyst solution increases linearly with the concentration of amide promoter used, whereas the acrylonitrile rate reaches a maximum at about 8% to 10% of amide promoter in solution.

These considerations indicate that a concentration of about 1% to 10% of amide promoter in the catalyst solution, and preferably about 2% to 8%, should be used to provide both a high rate of acrylonitrile production and a low relative rate of tar formation. However, if the rate of tar formation is not a major consideration, it may be desirable to use up to 16% or more of amide promotor. If the relative rate of tar formation is the primary consideration, it may be desirable to operate with only about 0.2% to 2% to amide promoter in solution.

The preferred amide promoters are substituted formamides having 1 to 3 of the hydrogens of formamide replaced by hydrocarbon groups of 1 to 10 carbon atoms each and free from aliphatic unsaturation; the hydrocarbon group being monovalent when substituted on the formamide carbon atom. Such amides include dimethylformamide, diethylformamide, dipropylformamides, dibutylformamides, N-formylpyrrolidine, N-formylpiperidine, N-methylformanilide, acetamide, dimethylacetamide, N-acetylmorpholine, N,N-dibutylpropionamides, N,N-diethyltoluamides, benzamide, and their homologs. Dimethylformamide and diethylformamide are especially preferred.

The organic nitrile solvent should boil above the boiling point of acrylonitrile (78° C.) so that the acrylonitrile can readily be separated by distillation. In general, for this reason and in order to avoid excessive loss from the catalyst composition, the organic nitrile should boil above 100° C. at atmospheric pressure and be relatively stable at this temperature. It is desirable to use an organic nitrile in which cuprous chloride is sufficiently soluble at 100° C. to form solutions containing over 10% cuprous chloride, and preferably at least 30%, by weight of the catalyst composition, since the concentration of cuprous chloride in solution has a marked effect on the maximum production rate which can be obtained.

The more desirable organic nitriles are those of the general formulas

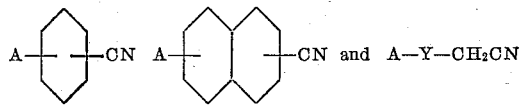

wherein A represents hydrogen, methyl, methoxy, halogen, dimethylamino and cyano substituents, and Y represents a divalent hydrocarbon group of 1 to 9 total carbon atoms having not more than 4 linear aliphatic carbon atoms in any single carbon chain, such linear carbons being fully saturated. Suitable organic nitriles include benzonitrile, tolunitriles, chlorobenzonitrile, methoxybenzonitrile, fluorobenzonitrile, phthalonitriles, naphthonitriles, phenylacetonitrile, phenylpropionitrile, phenylbutyronitrile, tetrahydrobenzonitrile, propionitrile, butyronitriles, chloropropionitrile, bromopropionitrile, methoxypropionitrile, dimethylaminopropionitrile, chlorobutyronitrile, bromobutyronitrile, bromovaleronitrile, succinonitrile, glutaronitrile, adiponitrile, and methyladiponitrile. Benzonitrile, adiponitrile and others of molecular weight above 100 are high boiling and are preferred.

The amount of organic nitrile solvent used should be sufficient to dissolve the cuprous chloride, without adding inorganic salt or salt of an organic amine to solubilize the cuprous chloride, and will generally be an amount at least equal in weight to the cuprous chloride to be dissolved, but the amount will depend upon the concentration of other components of the catalyst solution.

In the following examples, which illustrate specific embodiments of the invention, components of the reaction medium are expressed as percentages by weight of the catalyst solution after removal of materials volatile at the reaction temperature used:

Example 1

A reaction vessel was partially filled with 1900 grams of liquid reaction medium consisting of 36% cuprous chloride, 59% benzonitrile, 5% dimethylformamide and 0.063% silver chloride. The reaction medium was maintained at 100° C., throughout the run to be described, by a heat transfer jacket surrounding the reaction vessel and provided with suitable temperature controls.

A mixture of acetylene, hydrogen cyanide and hydrogen chloride was bubbled through the reaction medium under conditions such that the flow of acetylene was maintained constant at 6.4 liters/minute during the run, and the feed of hydrogen chloride was likewise constant at 1.6 liters/hour, but the feed of hydrogen cyanide was varied in accordance with analyses of the reactor off-gas to maintain about 0.4 mol percent HCN in the off-gas. Under these conditions, the hydrogen cyanide feed rate was from 2% to 3.5% greater than the amount which reacted, and the conversion to acvrylonitrile was from 77% to 91%. This corresponds to a ratio of acetylene to hydrogen cyanide in the feed from about 10:1 upwards, depending upon the rate of hydrogen cyanide feed. Tar was formed at a substantially uniform rate of 2.4 pounds per day per cubic foot of catalyst solution during the run, reaching a concentration of 23.8% in solution after 180 hours. This was offset by a decreasing content of benzonitrile, which vaporized slowly into the gases passing through the reactor, so that the weight of reaction medium was maintained substantially constant.

The production rate of acrylonitrile was determined by recovering the acrylonitrile from the reactor off-gases. The STY, as pounds per day per cubic foot of catalyst solution, started at a low value and increased rapidly to 60 at 8 hours, 70 at 20 hours, and 85 at 44 hours. A maximum of 90 was reached at 88 hours of operation and then the STY decreased to 80 at 130 hours, 65 at 144 hours and 50 at 180 hours, when the run was terminated.

For purposes of comparison, in a run conducted under the same conditions except that no silver salt was present, the STY rose to 55 at 8 hours and then declined to 50 at 44 hours. It was still 50 at 88 hours, 130 hours and 144 hours of operation. The STY then declined to 45 at 180 hours and 40 at 210 hours, when the run was terminated. The tar rate average 2.4 pounds of tar formed/day/cu. ft. of catalyst.

Example 2

A run was conducted as in Example 1 with a catalyst solution containing 0.058% silver cyanide instead of the silver chloride of Example 1, and with a constant feed of 8 liters/minute of acetylene. The hydrogen chloride feed was 1.6 liters/hour and the hydrogen cyanide feed was adjusted to provide about 0.25 mol percent HCN in the off-gas from the reatcor. The results were similar to those of Example 1. The STY rose to 60 after 8 hours of operation in this manner, was 73 at 24 hours, 90 at 44 hours, then declined to 80 at 94 hours, 65 at 160 hours, and 40 at 210 hours. The average tar rate was 2.5 pounds/day/cu. ft. of catalyst solution.

For comparison a run was conducted under the same conditions except that the dimethylformamide was omitted from the catalyst solution. This resulted in an STY which was substantially constant at only 5 pounds acrylonitrile/day/cu. ft. of catalyst solution.

Example 3

Example 1 was repeated except that the smaller quantity of 0.016% silver chloride was used in the catalyst solution. The acrylonitrile productivity in STY units, as before, was 60 at 8 hours, 70 at 24 hours, 80 at 50 to 90 hours, and then declined with further operation to 63 at 130 hours and 58 at 150 hours, when the run was terminated. The tar rate average 2.35 pounds/day/cu. ft. of catalyst solution.

Example 4

Example 1 was repeated except that the catalyst solution contained 8% diethylforamide instead of 5% of dimethylformamide, and contained only about 0.008% silver salt. A maximum productivity of 85 pounds acrylonitrile/day/cu. ft. of catalyst solution was reached, whereas the maximum obtained without silver salt was 70 STY under these conditions.

Since many different embodiments of the invention may be made without departing from the spirit and scope thereof, it is to be understood that the invention is not limited by the specific illustrations except to the extent defined in the following claims.

I claim:

1. A non-aqueous cuprous chloride catalyst composition comprising at least 5% by weight of cuprous chloride 0.2% to 30% by weight of a carboxamide promoter and 0.001% to 0.6% by weight of a silver salt activator and an organic nitrile boiling above 78° C. at atmospheric pressure and thermally stable at 100° C. as the essential component for dissolving the cuprous chloride, said carboxamide catalyst promoter having a boiling point of at least 100° C. at atmospheric pressure and said silver salt activator being present in said composition as a salt selected from the group consisting of silver chloride and silver cyanide.

2. A catalyst composition as defined in claim 1 wherein the carboxamide promoter is a substituted formamide having 1 to 3 of the hydrogens of formamide replaced by hydrocarbon groups of 1 to 10 carbon atoms each and free from aliphatic unsaturation.

3. A non-aqueous catalyst composition comprising a solution of at least 5% by weight cuprous chloride and 1% to 16% by weight dialkyl formamide having 1 to 4 carbon atoms in each alkyl substituent, dissolved in benzonitrile, and 0.001% to 0.6% silver salt activator by weight of the composition, said silver salt activator being selected from the group consisting of silver chloride and silver cyanide.

4. A catalyst composition as defined in claim 3 wherein the composition is a used catalyst containing 2% to 20% by weight of by-product tars from production of acrylonitrile.

References Cited
UNITED STATES PATENTS

| | | | |
|---|---|---|---|
| 2,999,072 | 9/1961 | Rowbottom | 252—429 |
| 2,999,073 | 9/1961 | Harris | 252—429 |
| 3,114,764 | 12/1963 | Rowbottom | 252—429 |

OTHER REFERENCES

Berkman et al.: "Catalysis," 1940, pages 365 and 406.

DANIEL E. WYMAN, *Primary Examiner*

L. G. XIARHOS, *Assistant Examiner.*